United States Patent Office 3,442,910
Patented May 6, 1969

3,442,910
PREPARATION OF HYDROCOUMARIN, COUMARIN AND ALKYL SUBSTITUTED DERIVATIVES
John G. Thweatt, Kingsport, Tenn., assignor to Eastman Kodak Company, Rochester, N.Y., a corporation of New Jersey
No Drawing. Filed June 22, 1967, Ser. No. 647,912
Int. Cl. C07d 7/28; B01j 11/01; A23d 5/04
U.S. Cl. 260—343.2    5 Claims

ABSTRACT OF THE DISCLOSURE

Hydrocoumarin, coumarin or alkyl substituted derivatives of these compounds, useful as flavorings and ordorants and hydrocoumarin, useful as an antioxidant for animal fats and oils, are prepared by the simultaneous dehydrogenation-cyclization of lower alkyl esters of 2-oxocyclohexanepropionic acid with or without substituents on the ring or side chain in the presence of a palladium, platinum, rhodium nickel or ruthenium catalyst.

---

This invention relates to an improved process for the preparation of coumarin and their alkyl substituted derivatives.

Hydrocoumarin and coumarin are old compositions. Prior art processes for the production of hydrocoumarin, coumarin and their derivatives, however, have not been completely satisfactory. One process suggested for the synthesis of coumarin involves the condensation of salicylaldehyde with acetic anhydride using sodium acetate as a catalyst. The disadvantage of this process is that it requires a lengthy period of heating at 180 to 200° C. Hydrocoumarin has usually been prepared by the reduction of coumarin in the presence of a catalyst.

It is an object of this invention to provide an improved process for the production of hydrocoumarin, coumarin and alkyl substituted derivatives of these compounds.

Another object is to provide a process for converting cyclohexanone and cyclohexanone alkyl substituted derivatives to hydrocoumarin, coumarin and alkyl substituted derivatives thereof.

Still another object is to provide an improved process for the preparation of hydrocoumarin, coumarin and their alkyl substituted derivatives by treating lower alkyl esters of 2-oxocyclohexanepropionic acid and alkyl substituted derivatives thereof in the vapor or liquid phase with hydrogenation-dehydrogenation catalysts.

These and other objects are attained by the practice of this invention which, briefly, comprises treating lower alkyl esters of 2-oxocyclohexanepropionic acid with or without alkyl substituents on the ring or side chain with hydrogenation-dehydrogenation catalysts at elevated tempertaures in the liquid or vapor phase. The cyclization and dehydrogenation reactions occur simultaneously and without formation of isolable intermediates.

Since cyclohexanone cannot be dehydrogenated to phenol under the relatively mild reaction conditions of the process of the invention, the results obtained from my process were unexpected. Furthermore, the results of the process could not be predicted since hexahydrocoumarin, resulting from the cyclization of the oxocyclohexanepropionate, can not be dehydrogenated to hydrocoumarin by using the catalysts and reaction conditions of my novel process.

The preferred starting material for use in the process of this invention, lower alkyl esters of 2-oxocyclohexanepropionic acid with or without substituents on the ring or side chain, may be prepared by converting a cyclohexanone to an enamine by reacting it with a secondary amine, treating the enamine with an ester of acrylic acid or a substituted acrylic acid, and hydrolyzing the enamine group. This sequence is illustrated as follows.

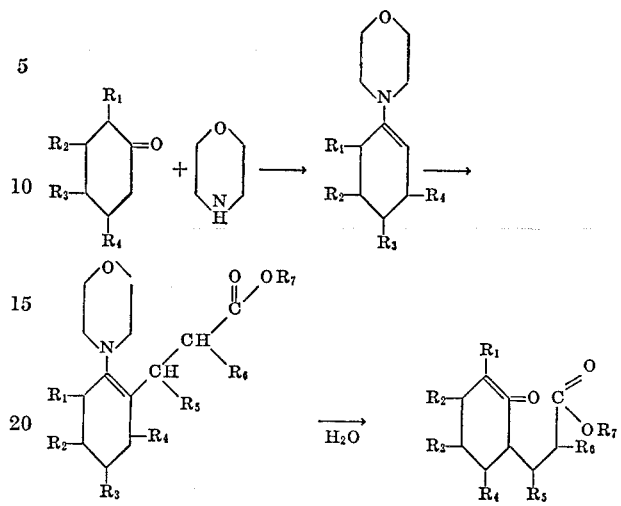

where $R_1$, $R_2$, $R_3$, $R_4$, $R_5$, $R_6$, and $R_7$ are the same or different and each represents hydrogen or lower alkyl, e.g. containing from about 1–4 carbon atoms, and where all the substituents combined contain a total of no more than 10 carbon atoms.

The above sequence of preparing 2-oxocyclohexanepropionate, which is described by Stork et al. in J. Am. Chem. Soc., 85, 207 (1963), is illustrated by reacting 4-methylcyclohexanone with methyl methacrylate to form methyl-2-oxocyclohexanepropionate.

The process of converting the 2-oxocyclohexanepropionate to hydrocoumarin, coumarin or alkyl substituted derivatives thereof is illustrated by the following equation:

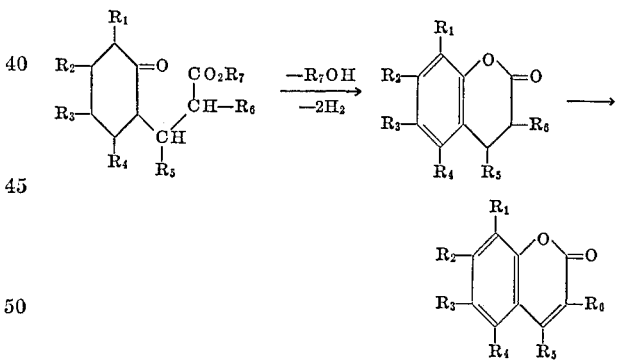

The cyclization and dehydrogenation reactions in converting the cyclohexanone derivatives to hydrocoumarin and coumarin occur simultaneously and without formation of isolable intermediates. An advantage of the process described here is that hydrocoumarin is the initial product and can be isolated as such. However, it can be seen that the process could be operated using a two stage reactor in which hydrocoumarin from the first stage is fed without isolation to a higher temperature second stage for the preparation of coumarin. It should be understood that all general references to hydrocourmarin and coumarin include the alkylated derivatives.

The metal catalysts useful in the process of the invention are the hydrogenation-dehydrogenation catalysts. This art recognized class of catalysts is made up of metals which catalyze either hydrogenation or dehydrogenation departing on the reaction conditions and the presence of hydrogen. The noble metals and nickel are examples of such hydrogenation-dehydrogenation catalysts. Specific examples of the catalysts useful in the process include palladium, platinum, rhodium, nickel and ruthenium. When the process of the invention is carried out in a fixed bed reactor, the catalytic metal is preferably used in combination with a carrier such as alumina, carbon or charcoal, kieselguhr, silica gel, etc. A preferred catalyst is palladium on aluimna. The amount of metallic catalyst necessary in the process of our invention can be varied over a wide range and is dependent on many variables such as the rate at which the reactant is fed in a fixed bed reactor, the conversion and yield desired, temperature and pressure variations, on whether the process is conducted in the vapor or liquid phase, the surface area per unit weight of the catalyst, etc. The amounts of metallic catalyst which can be used successfully in the vapor phase process range from about 0.1 to about 2.0 grams per 100 grams of reactant fed per hour and preferably about 0.3 to about 1.0 gram. With the commonly available commercial catalysts containing 0.5 to 1.0% active metal, contact times of about 0.2 to about 20 seconds are thus obtained with the preferred range being about 2 to about 10 seconds. In the liquid phase operation of the process of the invention, the amount of active metal catalyst can vary between about 0.02 to about 1.0 grams per 100 grams of reactant with a range of 0.10 to 0.40 being preferred.

The process of the invention can be performed either in the vapor or liquid phase. In the liquid phase operation of the process an inert solvent which boils at or above 250° C. is employed. Various hydrocarbons, halogenated hydrocarbons, aromatic ethers, etc. are useful as solvents in the liquid phase operation of the process. The preferred solvent is phenylether because it boils at the appropriate temperature with the result that the reaction temperature can be conveniently controlled.

The preferred temperature range for production of hydrocoumarin is about 275° C. to 325° C., although the product is obtained at temperatures of about 250 to about 400° C. The conversion of hydrocoumarin to coumarin can be carried out at about 350° C. to about 550° C. with the preferred range of about 425° C. to about 475° C. Although, for reasons of convenience, the process of the invention is preferably conducted at atmospheric pressures, i.e., 0 p.s.i.g., superatmospheric pressures can be used, e.g. up 500 p.s.i.g.

In the preparation of hydrocoumarin itself, use of the butyl ester is advantageous since the starting material and product are readily separated by distillation; thus operation under mild conditions is possible. However, the methyl ester gives good yields of hydrocoumarin even when the reaction is carried out with complete consumption of starting material. In addition to esters, the corresponding acids may be used as starting materials.

Illustrative of the alkyl groups are methyl, ethyl, propyl, isopropyl, butyl and isobutyl.

Coumarin and hydrocoumarin as well as their derivatives are useful as flavorings and odorants. Hydrocoumarin is also useful as an antioxidant for animal fats and oils.

The following examples illustrate the best modes contemplated for carrying out this invention.

EXAMPLE 1

A dehydrogenation reactor was prepared by placing in a 25-mm. Pyrex tube with a central thermocouple well a 2-cm. support bed of Vycor chips, a 15-cm. bed of 0.5% palladium on 8–14 mesh granular alumina, and a 10-cm. preheat section of Vycor chips. The reactor was heated in a vertical electric furnace and the catalyst temperature was measured by thermocouples near the top and bottom of the catalyst bed. With the catalyst bed at 300–500° C., methyl - 2 - oxocyclohexanepropionate was pumped into the top of the reactor from a bellows pump at 1.0 ml./min. In a period of 5.2 hours there was fed 297 g. of the starting keto ester. The effluent, which weighed 238 g., was distilled at 4-mm. pressure through a 42-cm. column packed with protruded metal packing at a reflux ratio of 4:1 until the head temperature reached 108° C. The residue weighed 157 g. Analysis of this residue by gas liquid chromatography on a Carbowax column showed it to be approximately 90% hydrocoumarin. In other similar experiments, it was shown by distillation of the entire mixtures that nonvolatile materials were not formed in the reaction in significant amounts. The yield of hydrocoumarin was 60%.

EXAMPLE 2

A reactor was prepared as described in Example 1 except that the catalyst bed was 10 cm. deep and the preheat section was 15 cm. Butyl-2-oxocyclohexanepropionate (317 g.) was pumped in over a period of 5.9 hrs. The catalyst temperature was raised from 278–310° C. at the start of the reaction to 295–330° C. near completion. The feed rate was varied between 42 ml./hr. and 72 ml./hr. and averaged 54 ml./hr. There was obtained 310 g. of effluent which was distilled through 90-cm. packed column to yield 129 g. of hydrocoumarin. The distillation residue of 89 g. was shown by gas liquid chromotography analysis to be almost pure starting material. The conversion to hydrocoumarin was 62% and the yield was 86%.

EXAMPLE 3

A reactor was prepared as described in Example 1 using an 8-cm. bed of 0.5% rhodium on ⅛" alumina pellets. While this reactor was heated in a furnace at 325° C., methyl-2-oxocyclohexanepropionate was added dropwise at a rate of 0.5 ml./min. By gas liquid chromatography analysis the effluent contained 50% hydrocoumarin, 40% starting material, and 10% materials with short retention time.

EXAMPLE 4

A reactor was prepared as described in Example 1 using 1.0% platinum on pelleted alumina as the catalyst. The reactor was heated in a furnace at 350° C. while methyl-2-oxocyclohexanepropionate was added dropwise. The effluent was examined by gas liquid chromatography and was found to consist of hydrocoumarin and coumarin along with some by-products of short retention time.

EXAMPLE 5

A reactor was prepared as described in Example 1 using nickel on kieselguhr (available as Harshaw Ni–0104–T nickel catalyst). The catalyst was pretreated with hydrogen at 295–345° C. before addition of methyl-2-oxocyclohexanepropionate was started. At a feed rate of 1.0 ml./min. and catalyst temperatures of 286–335° C. the effluent consisted of hydrocoumarin and a small amount of starting material along with by-products of short retention time.

EXAMPLE 6

A mixture of 21.5 g. of 2-oxocyclohexanepropionic acid, 20 g. of phenyl ether, and 1.0 g. of 5% palladium on carbon catalyst was heated with stirring. Vigorous gas evolution was apparent when the temperature reached 235° C. After 30 min. evolution of water was noted, and the water was collected in a Dean-Stark trip filled with xylene. The reaction was continued at 200–250° C. base temperature until no more water separated and evolution of gas was slow. After filtration to remove the catalyst, the mixture was distilled through a short Vigreux column to remove most of the phenyl ether. The product fraction, B.P. 110–114° C. at 3 mm., was analyzed by gas liquid chromatography. The major component was hydrocoumarin.

The following examples illustrate the conversion of coumarin to hydrocoumarin.

EXAMPLE 7

A 25-mm. tubular glass reactor was prepared by placing in it a 1-cm. support bed of crushed Vycor, a 22-cm.

bed of 0.5% palladium on 8-14 mesh granular alumina and a preheat section of 4 cm. of Vycor. The reactor was heated in a vertical electric furnace. A slow stream of nitrogen was passed through the reactor while hydrocoumarin was introduced in the top of the reactor from a bellows pump at a rate of 0.5-0.8 ml./min. The reactor temperature was 465-487° C. during the reaction. From 107 g. of hydrocoumarin there was obtained 97 g. of effluent. Analysis of the effluent by gas liquid chromotography indicated approximately 25% low boilers, 30% hydrocoumarin, and 45% coumarin. Thus the conversion to coumarin was 41% and the yield was 56%. The entire effluent was distilled at 5-mm. pressure to show that no significant amount of nonvolatile material was formed.

EXAMPLE 8

Reactors were prepared as described in Example 6. In the table below are shown the catalyst used, the temperature of the reaction, the amount of hydrocoumarin fed, the amount of effluent collected, and its composition as estimated by gas liquid chromotography.

| Catalyst a | Temp. | Hydrocoumarin Fed (g.) | Effluent (g.) | Composition, Percent | | |
|---|---|---|---|---|---|---|
| | | | | Low Boilers | Hydrocoumarin | Coumarin |
| 0.5% Ru | 433-454 | 57 | 51 | 22 | 36 | 42 |
| 1.0% Pd | 415-445 | 62 | 55 | 26 | 30 | 44 |
| 0.5% Pt | 430-500 | 65 | 61 | 20 | 42 | 38 |
| 0.5% Rh | b 400; 450 | 21 | (b) | 25 | 50 | 25 | a All catalysts supported on alumina.
b Small runs at two temperatures; products not isolated.

By the processes of the foregoing examples, there may be obtained from the following compounds:

ethyl-2-oxo-5-methylcyclohexanepropionate,
ethyl-2-oxo-4-methylcyclohexanepropionate,
propyl-2-oxo-5-isopropylcyclohexanepropionate,
isobutyl-2-oxo-4-methyl-5-propylcyclohexanepropionate and butyl-2-oxo-3,4,5-trimethylcyclohexanepropionate the respective hydrocoumarins as follows: 6-methylhydrocoumarin, 7-methylhydrocoumarin, 6-isopropylhydrocoumarin, 6-propyl-7-methyl hydrocumarin and 6,7,8-trimethylhydrocoumarin. By proper regulation of the temperature of the reaction the respective coumarin may be obtained.

The invention has been described in considerable detail with particular reference to certain preferred embodiments thereof, but it will be understood that variations and modifications can be effected within the spirit and scope of the invention as described hereinbefore and as defined in the appended claims.

I claim:

1. A process for the production of compounds selected from the group consisting of hydrocoumarin, coumarin, and alkyl substituted derivatives thereof comprising heating in the presence of a catalyst selected from the group consisting of palladium, platinum, rhodium, nickel or ruthenium, a compound having the formula:

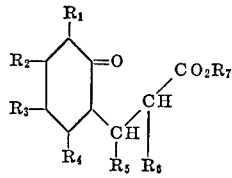

wherein each of the substituents $R_1$, $R_2$, $R_3$, $R_4$, $R_5$, $R_6$ and $R_7$ each represents hydrogen or lower alkyl and where all of the substituents combined contain a total of not more than 10 carbon atoms.

2. A process according to claim 1 wherein said heating is in the temperature range of about 250° C. to about 550° C.

3. A process according to claim 2 wherein the process is conducted at a pressure of about 0 p.s.i.g. to about 500 p.s.i.g.

4. A process for preparing hydrocoumarin according to claim 1 in which the process is carried out at a temperature of about 275-325° C. at about atmospheric pressure in the presence of a catalytic amount of palladium on alumina.

5. A process for preparing coumarin according to claim 1 in which the process is carried out at a temperature of about 425-475° C. at about atmospheric pressure in the presence of a catalytic amount of palladium on alumina.

References Cited

Stork et al., J. Amer. Chem. Soc., vol. 85 (1963), p. 207.

JAMES A. PATTEN, *Primary Examiner.*

U.S. Cl. X.R.

99—163; 252—407